US008433849B2

(12) United States Patent
De Schrijver et al.

(10) Patent No.: US 8,433,849 B2
(45) Date of Patent: Apr. 30, 2013

(54) HIERARCHICAL, DISTRIBUTED OBJECT STORAGE SYSTEM

(75) Inventors: Frederik De Schrijver, Wenduine (BE); Romain Raymond Agnes Slootmaekers, Heverlee (BE); Bastiaan Stougie, Melle (BE); Kristof Mark Guy De Spiegeleer, Knokke-Heist (BE); Wim De Wispelaere, Ghent (BE); Wouter Van Eetvelde, Sint-Amandsberg (BE)

(73) Assignee: Amplidata NV, Lochristi (BE)

( * ) Notice: Subject to any disclaimer, the term of this patent is extended or adjusted under 35 U.S.C. 154(b) by 0 days.

(21) Appl. No.: 13/336,558

(22) Filed: Dec. 23, 2011

(65) Prior Publication Data

US 2012/0166726 A1  Jun. 28, 2012

Related U.S. Application Data

(60) Provisional application No. 61/427,339, filed on Dec. 27, 2010.

(51) Int. Cl.
*G06F 12/00* (2006.01)

(52) U.S. Cl.
USPC .................................. 711/114; 711/E12.103

(58) Field of Classification Search .................. None
See application file for complete search history.

(56) References Cited

U.S. PATENT DOCUMENTS

| | | | | |
|---|---|---|---|---|
| 6,405,284 | B1 * | 6/2002 | Bridge | 711/114 |
| 6,728,831 | B1 * | 4/2004 | Bridge | 711/112 |
| 6,826,711 | B2 * | 11/2004 | Moulton et al. | 714/6.12 |
| 7,093,182 | B2 * | 8/2006 | Dickson | 714/770 |
| 7,146,521 | B1 | 12/2006 | Nguyen | |
| 7,418,620 | B1 | 8/2008 | Tormasov et al. | |
| 7,536,693 | B1 | 5/2009 | Manczak et al. | |
| 7,577,767 | B1 | 8/2009 | Robillard et al. | |
| 7,657,581 | B2 * | 2/2010 | Orenstein et al. | 707/661 |
| 2002/0078244 | A1 | 6/2002 | Howard | |
| 2003/0188097 | A1 | 10/2003 | Holland et al. | |
| 2006/0106878 | A1 | 5/2006 | Shitomi et al. | |
| 2007/0136525 | A1 | 6/2007 | Read | |
| 2007/0214314 | A1 | 9/2007 | Reuter | |
| 2008/0313241 | A1 | 12/2008 | Li et al. | |
| 2011/0113282 | A1 | 5/2011 | De Spiegeleer et al. | |

FOREIGN PATENT DOCUMENTS

| | | |
|---|---|---|
| EP | 2 469 411 A1 | 6/2012 |
| WO | 99/08173 | 2/1999 |
| WO | 2009135630 | 11/2009 |
| WO | 2010/091101 A1 | 8/2010 |

(Continued)

OTHER PUBLICATIONS

Webopedia, "RAIN", Dec. 27, 2007, pp. 1-2, http://web.archive.org/web/20071227083050/http://www.webopedia.com/TERM/R/RAIN.html.*

(Continued)

*Primary Examiner* — Edward Dudek, Jr.
*Assistant Examiner* — Christopher Birkhimer
(74) *Attorney, Agent, or Firm* — Bacon & Thomas, PLLC

(57) ABSTRACT

The invention concerns a distributed object storage system (1) that comprises a spreading module (410) which makes a selection of a number of storage elements (300) being larger or equal to a desired spreading width by means of a spreading policy that comprises rules for selecting storage elements (300) in function of a first hierarchy level identifier (70.1) and/or a second hierarchy level identifier (70.2).

14 Claims, 9 Drawing Sheets

FOREIGN PATENT DOCUMENTS

| | | |
|---|---|---|
| WO | 2011/113504 A1 | 9/2011 |
| WO | 2012/089701 A1 | 7/2012 |
| WO | 2012/089727 A1 | 7/2012 |

OTHER PUBLICATIONS

Vasken Bohossian et al., "Computing in the Rain: A Reliable Array of Independent Nodes", Feb. 2001, IEEE Trantions on Parallel and Distributed Systems, Vo. 12, No. 2, http://authors.library.caltech.edu/5359/1/BOHieeetpds01.pdf.*

Ganger et al., "Storage Area Networking—Object-Based Storage", IEEE Communications Magazine, IEEE Service Center, vol. 41, No. 8, Aug. 1, 2003, XP011099971, pp. 84-90.

ANSI: "SCSI Object-Based Storage Device Commands (OSD)", Internet citation, Jul. 30, 2004, XP002474837, retrieved from the Internet: http://www.t10.org/ftp/t10/drafts/osd/osd-r10.pdf, pp. 75-164.

* cited by examiner

HIERARCHICAL, DISTRIBUTED OBJECT STORAGE SYSTEM

CROSS REFERENCE TO RELATED APPLICATIONS

The benefit of provisional patent application No. 61/427,339 filed Dec. 27, 2010 is claimed.

FIELD OF THE INVENTION

The present invention generally relates a distributed data storage system. Typically, such distributed storage systems are targeted at storing large amounts of data, such as objects or files in a distributed and fault tolerant manner with a predetermined level of redundancy. The present invention relates more particularly to a distributed object storage system.

BACKGROUND OF THE INVENTION

The advantages of object storage systems, which store data objects referenced by an object identifier versus file systems, such as for example US2002/0078244, which store files referenced by an inode or block based systems which store data blocks referenced by a block address in terms of scalability and flexibility are well known. Object storage systems in this way are able to surpass the maximum limits for storage capacity of file systems in a flexible way such that for example storage capacity can be added or removed in function of the needs, without degrading its performance as the system grows. This makes such object storage systems excellent candidates for large scale storage systems.

Such large scale storage systems are required to distribute the stored data objects in the object storage system over multiple storage elements, such as for example hard disks, or multiple components such as storage nodes comprising a plurality of such storage elements. However as the number of storage elements in such a distributed object storage system increase, equally the probability of failure of one or more of these storage elements increases. To cope therewith it is required to introduce a level of redundancy into the distributed object storage system. This means that the distributed object storage system must be able to cope with a failure of one or more storage elements without data loss. In its simplest form redundancy is achieved by replication, this means storing multiple copies of a data object on multiple storage elements of the distributed object storage system. In this way when one of the storage elements storing a copy of the data object fails, this data object can still be recovered from another storage element holding a copy. Several schemes for replication are known in the art. In general replication is costly as the storage capacity is concerned. This means that in order to survive two concurrent failures of a storage element of a distributed object storage system, at least two replica copies for each data object are required, which results in storage capacity overhead of 200%, which means that for storing 1 GB of data objects a storage capacity of 3 GB is required. Another well-known scheme is referred to as RAID systems of which some implementations are more efficient than replication as storage capacity overhead is concerned. However, often RAID systems require a form of synchronisation of the different storage elements and require them to be of the same type and in the case of drive failure require immediate replacement, followed by a costly and time consuming rebuild process. Therefor known systems based on replication or known RAID systems are generally not configured to survive more than two concurrent storage element failures. Therefor it has been proposed to use distributed object storage systems that are based on erasure encoding, such as for example described in WO2009135630 or US2007/0136525. Such a distributed object storage system stores the data object in encoded sub blocks that are spread amongst the storage elements in such a way that for example a concurrent failure of six storage elements out of minimum of sixteen storage elements can be tolerated with a corresponding storage overhead of 60%, that means that 1 GB of data objects only require a storage capacity of 1.6 GB.

Current erasure encoding based distributed object storage system for large scale data storage still require extensive static configuration activities when for example certain storage elements need to be replaced, powered down or added.

Therefor there still exists a need for a simple configuration facility that is able to cope with the dynamic nature of large scale distributed object storage systems.

SUMMARY OF THE INVENTION

According to a first aspect of the invention, there is provided a distributed object storage system comprising:
 a plurality of redundant storage elements, operable to store and retrieve a data object comprising a data object identifier in the form of a predetermined number of redundant sub blocks comprising said data object identifier, said predetermined number corresponding to a predetermined multiple of a desired spreading width, which consists of the sum of:
   a minimal spreading requirement, corresponding to the minimal number of storage elements that must store sub blocks of said data object and are not allowed to fail; supplemented with
   a maximal concurrent failures tolerance, corresponding to the number of storage elements that must store sub blocks of said data object and are allowed to fail concurrently;
 each one of said redundant sub blocks comprising:
   encoded data of equal size of the data object divided by a factor equal to said predetermined multiple of said minimal spreading requirement; and
   decoding data, such that said data object can be decoded from any combination of said redundant sub blocks of which the number corresponds to predetermined multiple of said minimal spreading requirement.
 a plurality of storage nodes each comprising a share of said plurality of redundant storage elements; and
 at least one controller node, operably connected to or comprised within said storage nodes when storing or retrieving said data object, comprising:
   an encoding module operable to disassemble said data object into said predetermined number of redundant sub blocks;
   a spreading module operable to store said predetermined number of said redundant sub blocks on a number of said storage elements being larger or equal to said desired spreading width;
   a clustering module operable to retrieve at least said predetermined multiple of said minimal spreading requirement of said redundant sub blocks from a plurality of said storage elements; and
   a decoding module operable to assemble said data object from any combination of said redundant sub blocks of which the number corresponds to said predetermined multiple of said minimal spreading requirement, Characterized in that
each of said plurality of redundant storage elements comprises a unique storage element identifier, said storage element identifier comprising:
- a first hierarchy level identifier, which provides an identifier for the storage node comprising said storage element identified by said storage element identifier; and
- a second hierarchy level identifier, which provides an identifier for a predetermined selection of a plurality of storage nodes comprising said storage element identified by said storage element identifier, and said spreading module making a selection of said number of storage elements being larger or equal to said desired spreading width by means of a spreading policy that comprises rules for selecting storage elements in function of said first hierarchy level identifier and/or said second hierarchy level identifier.

This enables a distributed object storage system with a hierarchical configuration that can be easily implemented in a dynamic system in which on a continuous basis storage elements are added, replaced or removed. It does this in a way that requires less configuration then any prior art system while not compromising efficiency in implementing a redundancy policy and allowing for augmented data security with a spreading policy. The only configuration that is required is providing the storage element with a unique storage element identifier that provides it with information concerning its position in the hierarchical configuration.

Furthermore the dependent claims disclose various performance enhancements made possible by the hierarchical distributed object storage system according to the invention.

DETAILED DESCRIPTION OF EMBODIMENT(S)

Figure 1:
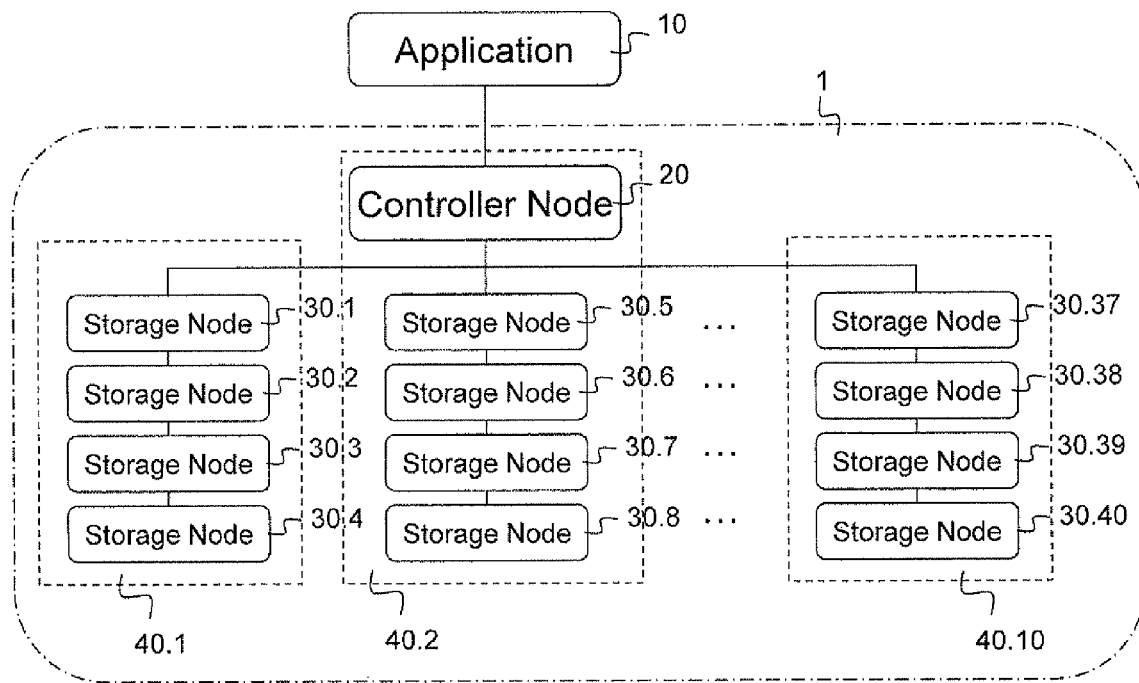
FIG. 1 illustrates a distributed object storage system according to the invention.

FIG. 1 shows a distributed object storage system 1 according to the invention. It is connected to an application 10 for transferring data objects. This connection could be implemented as a suitable data communication network. Such an application could for example be a dedicated software application running on a computing device, such as a personal computer, a lap top, a wireless telephone, a personal digital assistant or any other type of communication device, that is able to interface directly with the distributed object storage system 1, but said application 10 could alternatively comprise a suitable file system which enables a general purpose software application to interface with the distributed object storage system 1 or an Application Programming Interface library. As further shown in FIG. 1 the distributed object storage system comprises a controller node 20 and a plurality of storage nodes 30.1-30.40 all interconnected in a suitable way for transferring data, for example by means of a conventional data communication network such as a local area network (LAN), a wide area network (WAN), a telephone network, such as the Public Switched Telephone Network (PSTN), an intranet, the internet, any other suitable network or combination of networks. Controller nodes 20, storage nodes 30 and the device comprising application 10 may connect to said data communication network by wired, wireless and/or optical connections.

According to alternative embodiments of the distributed object storage system could comprise any other suitable number of storage nodes 30 and for example two three or more controller nodes 20 also connected to these storage nodes 20. These controller nodes 20 and storage nodes 30 can be built as general purpose computers, however more frequently they are physically adapted for arrangement in large data centres, where they are arranged in modular racks 40 comprising standard dimensions. Particular controller nodes 20 and storage nodes 30, such as for example the Amplistor AS20 storage node as manufactured by Amplidata, are dimensioned to take up a single unit of such rack 40, which is generally referred to as 1 U.

As shown in FIG. 1 several storage nodes 30 can be grouped together, for example because they are housed in a single rack 40. For example storage nodes 30.1-30.4; 30.5-30.8; . . . ; and 30.7-30.40 each are respectively grouped into racks 40.1, 40.2, . . . 40.10. Controller node 20 could for example be located in rack 40.2. These racks are not required to be located at the same location, they are often geographically dispersed across different data centres, such as for example rack 40.1-40.3 can be located at a data centre in Europe, 40.4-40.7 at a data centre in the USA and 40.8-40.10 at a data centre in China.

Figure 2:
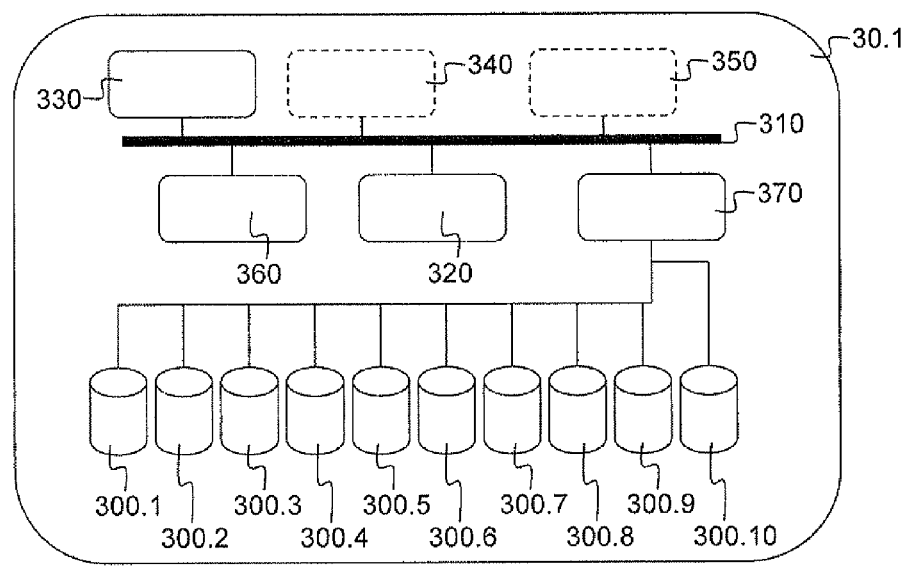
FIG. 2 schematically illustrates a storage node of the distributed object storage system of FIG. 1.

FIG. 2 shows a schematic representation of one of the storage nodes 30. Storage node 30.1 may comprise a bus 310, a processor 320, a local memory 330, one or more optional input units 340, one or more optional output units 350, a communication interface 360, a storage element interface 370 and a plurality of storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or controller nodes 20 such as for example two 1 Gb Ethernet interfaces. Storage element interface 370 may comprise a storage interface such as for example a Serial Advanced Technology Attachment (SATA) interface or a Small Computer System Interface (SCSI) for connecting bus 310 to one or more storage elements 300, such as one or more local disks, for 2 TB SATA-II disk drives, and control the reading and writing of data to/from these storage elements 300. In one exemplary embodiment as shown in FIG. 2, such a storage node 30.1 could comprise ten 2 TB SATA-II disk drives as storage elements 300.1-300.10 and in this way storage node 30.1 would provide a storage capacity of 20 TB to the distributed object storage system 1. According to the exemplary embodiment of FIG. 1 and in the event that storage nodes 30.2-30.40 are identical to storage node 30.1, the distributed object storages system 1 would then have a total storage capacity of 800 TB.

Taking into account FIGS. 1 and 2 the distributed object storage system 1 comprises a plurality of redundant storage elements 300. The storage nodes 30 each comprise a share of these storage elements 300. As shown in FIG. 1 storage node 30.1 comprises ten storage elements 300.1-300.10. Other storage nodes 30 could comprise a similar amount of storage elements, but this is however not essential. Storage node 30.2 could for example comprise eight storage elements 300.11-300.18. As will be explained in further detail below with respect to FIGS. 5 and 6, the distributed object storages system 1 is operable to store and retrieve a data object 500 comprising data 520, for example 64 MB of binary data and a data object identifier 510 for addressing this data object 500, for example a universally unique identifier such as a globally unique identifier (GUID). Storing the data offered for storage by the application 10 in the form of a data object, also referred to as object storage, has specific advantages over other storage schemes such as conventional block based storage or conventional file based storage, such as scalability and flexibility, which are of particular importance in a distributed object storage system 1 that is directed to large scale redundant storage applications, sometimes also referred to as cloud storage.

The storage elements 300 are redundant and operate independently of one another. This means that if one particular storage element 300 fails its function can easily be taken on by another storage element 300 in the distributed storage system. However as will be explained in more detail further below, there is no need for the storage elements 300 to work in synchronism, as is for example the case in many well-known RAID configurations, which sometimes even require disc spindle rotation to be synchronised. Furthermore the independent and redundant operation of the storage elements 300 allows to use any suitable mix of types storage elements 300 to be used in a particular distributed object storage system 1. It is possible to use for example storage elements with differing storage capacity, storage elements of differing manufacturers, using different hardware technology such as for example conventional hard disks and solid state storage elements, using different storage interfaces such as for example different revisions of BATA, PATA and so on. All this results in specific advantages for scalability and flexibility of the distributed object storage system 1 as it allows to add or remove storage elements 300 without imposing specific requirements to their design in correlation to other storage elements 300 already in use in that distributed object storage system 1.

Figure 3:
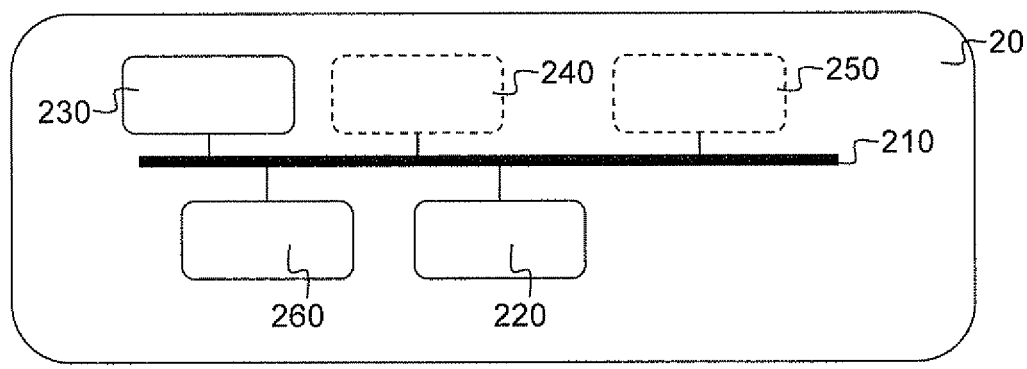
FIG. 3 schematically illustrates a controller node of the distributed object storage system of FIG. 1.

FIG. 3 shows a schematic representation of the controller nodes 20. Controller node 20 may comprise a bus 210, a processor 220, a local memory 230, one or more optional input units 240, one or more optional output units 250. Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to said controller node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables controller node 20 to communicate with other devices and/or systems, for example mechanisms for communicating with other storage nodes 30 or controller nodes 20 such as for example two 10 Gb Ethernet interfaces.

According to an alternative embodiment the controller node 20 could have an identical design as a storage node 30, or according to still a further alternative embodiment one of the storage nodes 30 of the distributed object storage system could perform both the function of a controller node 20 and a storage node 30. According to still a further embodiment the device on which the application 10 runs is a controller node 30.

Figure 4:
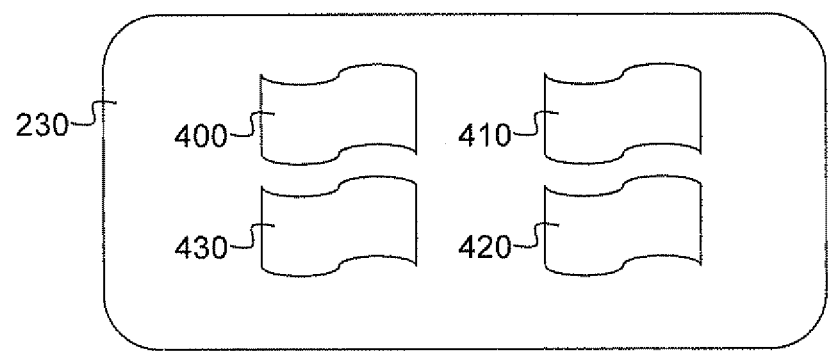
FIG. 4 schematically illustrates some elements of the controller node of FIG. 3 in more detail.

As schematically shown in FIG. 4, controller node 20 comprises four modules: an encoding module 400; a spreading module 410; a clustering module 420; and a decoding module 430. These modules 400, 410, 420, 430 can be implemented as programming instructions stored in local memory 230 of the controller node 20 for execution by its processor 220.

The functioning of these modules 400, 410, 420, 430 will now be explained to FIGS. 5 and 6. The distributed object storage system 1 stores a data object 500 offered by the application 10 in function of a reliability policy which guarantees a level of redundancy. That means that the distributed object storage system 1 must for example guarantee that it will be able to correctly retrieve 500 even if a number of storage elements 300 would be unavailable, for example because they are damaged or inaccessible. Such a reliability policy could for example require the distributed object storage system 1 to be able to retrieve the data object 500 in case of six concurrent failures of the storage elements 300 it comprises. In large scale data storage massive amounts of data are stored on storage elements 300 that are individually unreliable, as such redundancy must be introduced into the storage system to improve reliability. However the most commonly used form of redundancy, straightforward replication of the data on multiple storage elements 300 is only able to achieve acceptable levels of reliability at the cost of unacceptable levels of overhead. For example, in order to achieve sufficient redundancy to cope with six concurrent failures of storage elements 300, data objects 500 would need to be replicated six times and stored on redundant storage elements 300. This means that next to the master copy of a data object 500 stored on one storage element 300, six replica's must be stored on six other storage elements. As such storing 1 GB of data objects in this way would result in the need of 7 GB of storage capacity in a distributed object storage system, this means an increase in the storage cost by a factor of seven or an additional storage overhead of 600%, Therefor the distributed object storage system 1 according to the invention makes use of erasure coding techniques in order to achieve the requirements of the reliability policy with considerably less overhead. As will be explained in further detail below when using an erasure encoding with a rate of encoding r=10/16 six concurrent failures of storage element 300 can be tolerated, which only require a storage overhead of 60% or a storage cost by a factor of 1.6. This means that storing 1 GB of data objects in this way only results in the need of 1.6 GB of storage capacity in the distributed object storage system 1. Some erasure encoding techniques make use of Reed-Solomon codes, but also fountain codes or rateless erasure codes such as online codes, LDPC codes, raptor codes and numerous other coding schemes are available.

Figure 5:
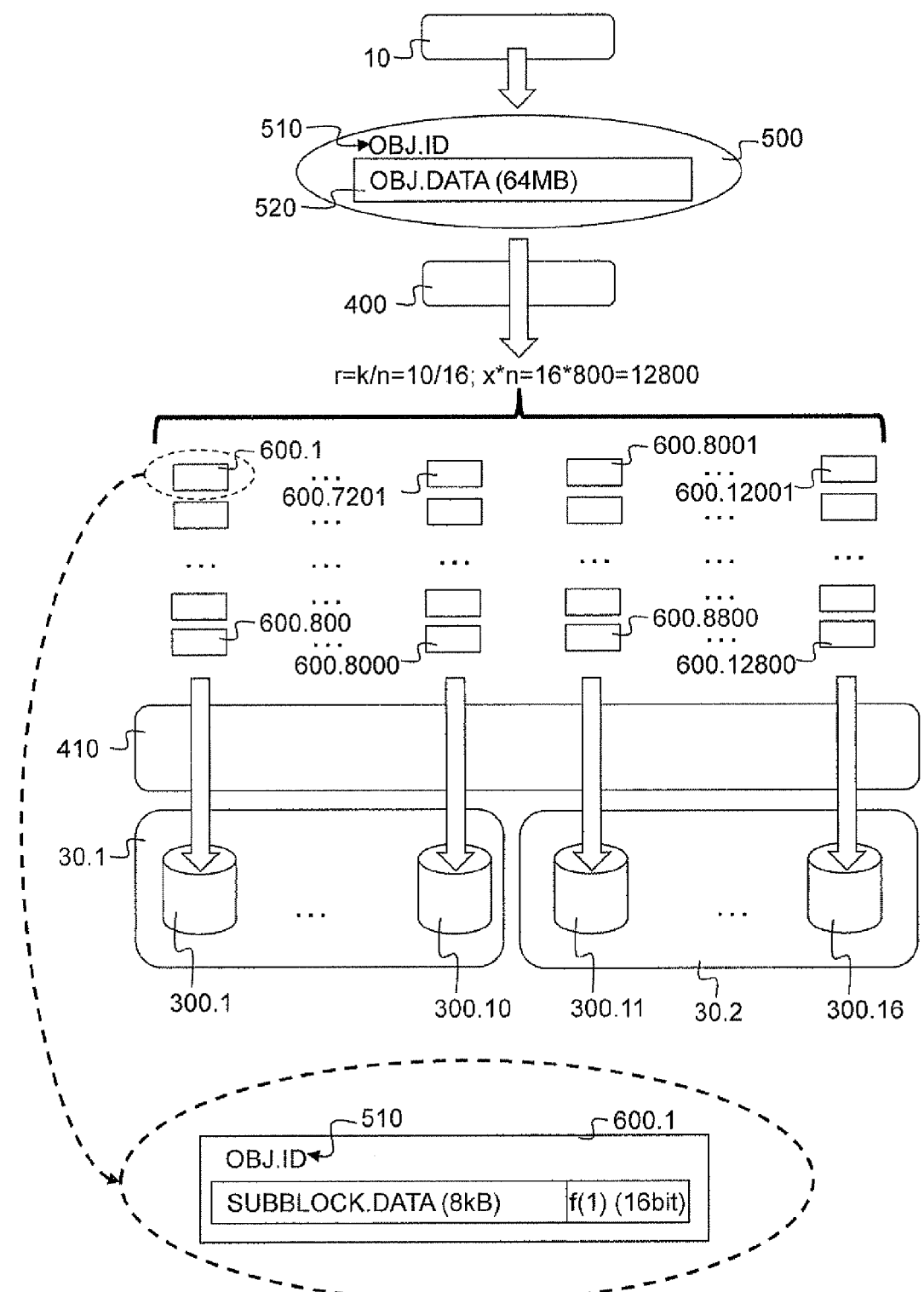
FIG. 5 schematically illustrates a storage operation.

FIG. 5 shows a storage operation performed by an embodiment distributed object storage system 1 that is able to tolerate six concurrent failures of a storage element 300. The data object 500 is offered to the distributed object storage system 1 by the application 10 requesting a storage operation. In this embodiment the data object 500 comprises an object identifier 510, such as for example a GUID, and object data 520, for example consisting of 64 MB of binary data. This data object 500 is offered to the encoding module 400 of the controller node 20. The encoder module 400 will disassemble the data object 500 into a predetermined number x*n=16*800=12800 of redundant sub blocks 600, which also comprise the data object identifier 510. This predetermined number x*n=16*800=12800 corresponds to a predetermined multiple x=800 of a desired spreading width n=16. This desired spreading width n=16=k+f=10+6 consists of the sum of a minimal spreading requirement k=10 and a maximal concurrent failures tolerance f=6. This maximal concurrent failures tolerance f=6 corresponds to the number of storage elements 300 that store sub blocks 600 of said data object 500 and are allowed to fail concurrently as determined by the reliability policy. The minimal spreading requirement k=10, corresponds to the minimal number of storage elements 300 that must store sub blocks 600 of said data object 500 and are not allowed to fail. The encoder module 400 makes use of an erasure encoding scheme to produce these predetermined number x*n=16*800=12800 redundant sub blocks 600.1-600.12800. In this way each one of these redundant sub blocks 600, such as for example sub block 600.1 comprises encoded data of equal size of the data object 500 divided by a factor equal to said predetermined multiple of said minimal spreading requirement x*k=800*10=8000. This means that the size of sub block 600.1 in the example above with a data object of 64 MB will be 8 kB, as this corresponds to 64 MB divided by x*k=800*10=8000. Sub block 600.1 will further comprise decoding data f(1), such that said data object 500 can be decoded from any combination of said redundant sub blocks 600 of which the number x*k=800*10=8000 corresponds to said predetermined multiple x=800 of said minimal spreading requirement k=10. To accomplish this the encoder module 400 will preferably make use of an erasure encoding scheme with a rate of encoding r=k/n=10/16 which corresponds to the minimal spreading requirement k=10 divided by the desired spreading width n=16. In practice this means that the encoder module 400 will first split the data object 500 of 64 MB into x*k=800*10=8000 chunks of 8 kB, subsequently using an erasure encoding scheme with a rate of encoding of r=k/n=10/16 it will generate x*n=800*16=12800 encoded redundant sub blocks 600.1-600.12800 which comprise 8 kB of encoded data, this means encoded data of a size that is equal to the 8 kB chunks; and decoding data f(1)-f(12800) that allows for decoding. The decoding data could be implemented as for example be a 16 bit header or another small size parameter associated with the sub block 600, such as for example a suitable sub block identifier. Because of the erasure encoding scheme used, namely a rate of encoding r=k/n=10/16, the sub blocks 600.1-600.12800 allow the data object 500 to be decoded from any combination of sub blocks 600 which corresponds to the predetermined multiple of the minimal spreading requirement x*k=800*10=8000, such as for example the combination of sub blocks 600.1-600.4000 and sub blocks 600.8001-600.12000. The storage cost of such an erasure coding scheme is inversely proportional to the rate of encoding and in this particular embodiment will be a factor of 1/r=1/(10/16)=1.6. This means that according to this embodiment of the distributed object storage system 1 of the invention 1 GB of data objects 500 will result in a need for a storage capacity of 1.6 GB.

Subsequently, as shown in FIG. 5, the spreading module 410 will store the predetermined number x*n=800*16=12800 of encoded redundant sub blocks 600.1-600.12800 on a number of storage elements 300 which corresponds to said desired spreading width n=16, such as for example storage elements 300.1-300.16. The spreading module 410 will store on each of these storage elements 300.1-300.16 said predetermined multiple x=800 of these sub blocks 600, As shown in FIG. 5 sub blocks 600.1-600.800 are stored on storage element 300.1, the next x=800 of these sub blocks are stored on storage element 300.2 and so on until the last x=800 of these sub blocks 12001-12800 are stored on storage element 300.16. As shown in FIG. 5 storage elements 300.1-300.10 are arranged in storage node 30.1 and storage elements 300.11-300.16 are arranged in storage node 30.2.

According to an alternative embodiment the sub blocks could be spread by the spreading module 410 on a number of storage elements 300 which is larger than said desired spreading width n=16, for example n+1=16+1=17 storage elements 300. This could be implemented by for example storing sub blocks 600.12001-600.12400 on storage element 300.16 and storing sub blocks 600.12401-12800 on storage element 300.16. It is clear that this would still allow for the storage system 1 to cope with f=6 concurrent failures of storage elements 300. Alternative methods for determining the share of sub blocks to be stored on specific storage elements 300 are well known to the person skilled in the art and are for example described in WO2009135630.

It is clear that according to alternative embodiments of the invention other values could have been chosen for the parameters x, f, k, n=k+f and r=k/n mentioned in embodiment above, such as for example x=400, f=4, k=12; n=k+f=12+4=16 and r=12/16; or any other possible combination that conforms to a desired reliability policy for redundancy and concurrent failure tolerance of storage elements 300 of the distributed object storage system 1.

According to still a further alternative there could be provided a safety margin to the number of concurrent failures f that a distributed object storage system 1 needs to be able to cope with. In such an embodiment some of the efficiency is traded in for some additional redundancy over what is theoretically required. This preventively increases the tolerance for failures and the time window that is available for a repair activity. However according to a preferred embodiment this safety margin will be rather limited such that it only accounts for an increase in sub blocks that must be generated and stored of for example approximately 10% to 30%, such as for example 20%.

Figure 6:
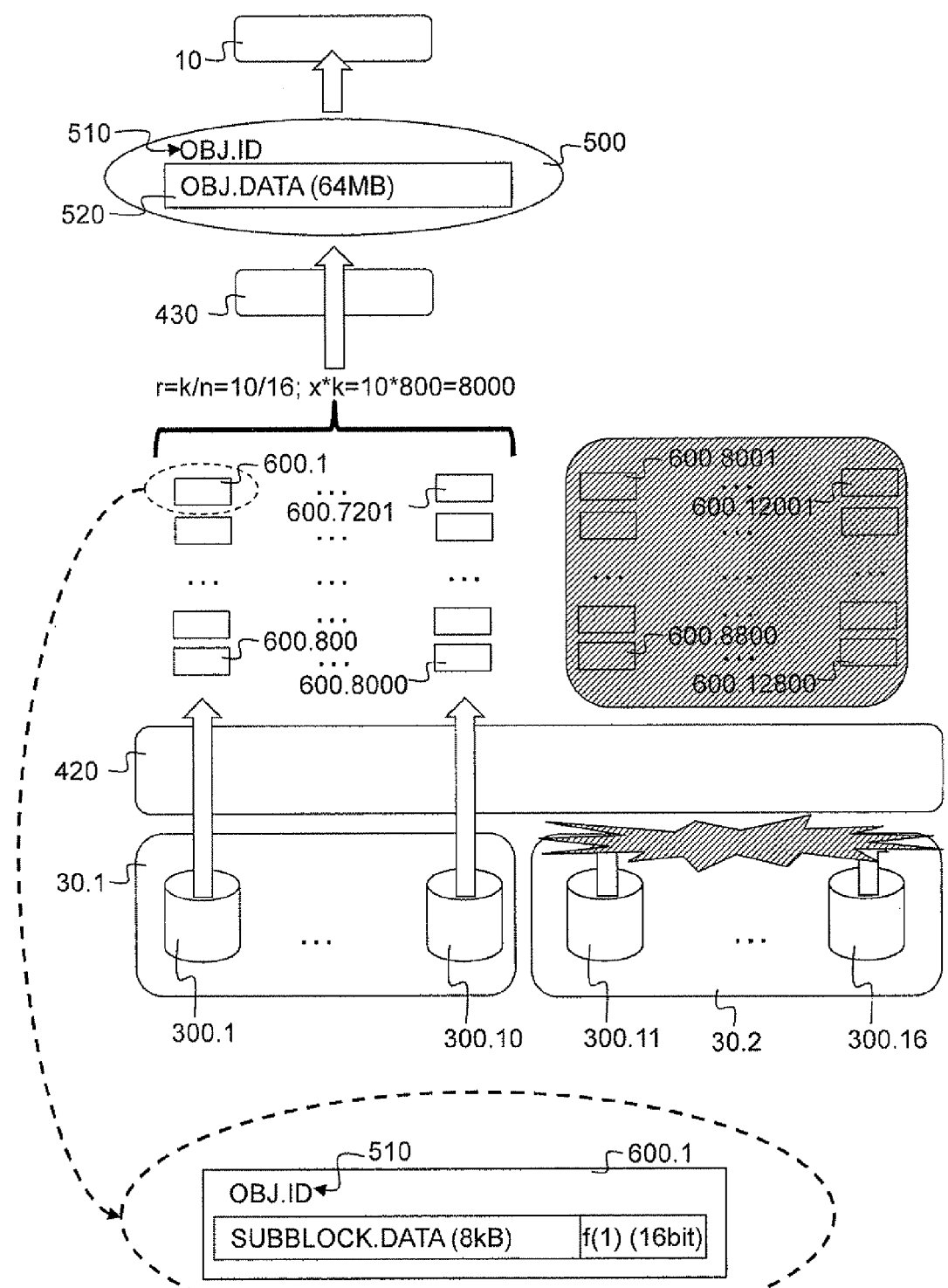
FIG. 6 schematically illustrates a retrieval operation.

FIG. 6 shows a retrieval operation performed by the embodiment of the distributed object storage system 1 as described for the storage operation of FIG. 5 that is able to tolerate six concurrent failures of a storage element 300. The data object 500 is requested from the distributed object storage system 1 by the application 10 requesting a retrieval operation. As explained above, in this embodiment the requested data object 500 can be addressed by its object identifier 510. In response to this request for a retrieval operation the clustering module 520 of the controller node 20 will initiate the retrieval of the sub blocks 600 associated with this data object identifier. It will try to retrieve the predetermined number x*n=16*800=12800 of redundant sub blocks 600.1-600.12800 that were stored on the storage elements 300.1-300.16. Because of the encoding technology used and the corresponding decoding techniques available, it is sufficient for the clustering module 420, to retrieve said predetermined multiple of said minimal spreading requirement x*k=800*10=8000 of said redundant sub blocks 600 from these storage elements 300.1-300.16. This could be the case when for example there is a problem in network connectivity between the controller node 20 and storage node 30.2 as indicated in FIG. 6. In that case the retrieval operation of the clustering module will be able to retrieve the sub blocks 600.1-600.8000 which corresponds to said predetermined multiple of said minimal spreading requirement x*k=800*10=8000. The retrieved sub blocks 600.1-600.8000 allow the decoding module 430 to assemble data object 500 and offer it to the application 10. It is clear that any number in any combination of the redundant sub blocks 600 corresponding to said data object 500, as long as their number is equal to or larger than the predetermined multiple of the minimal spreading requirement x*k=800*10=8000, would have enabled the decoding module 430 to assemble the data object 500.

Figure 7:
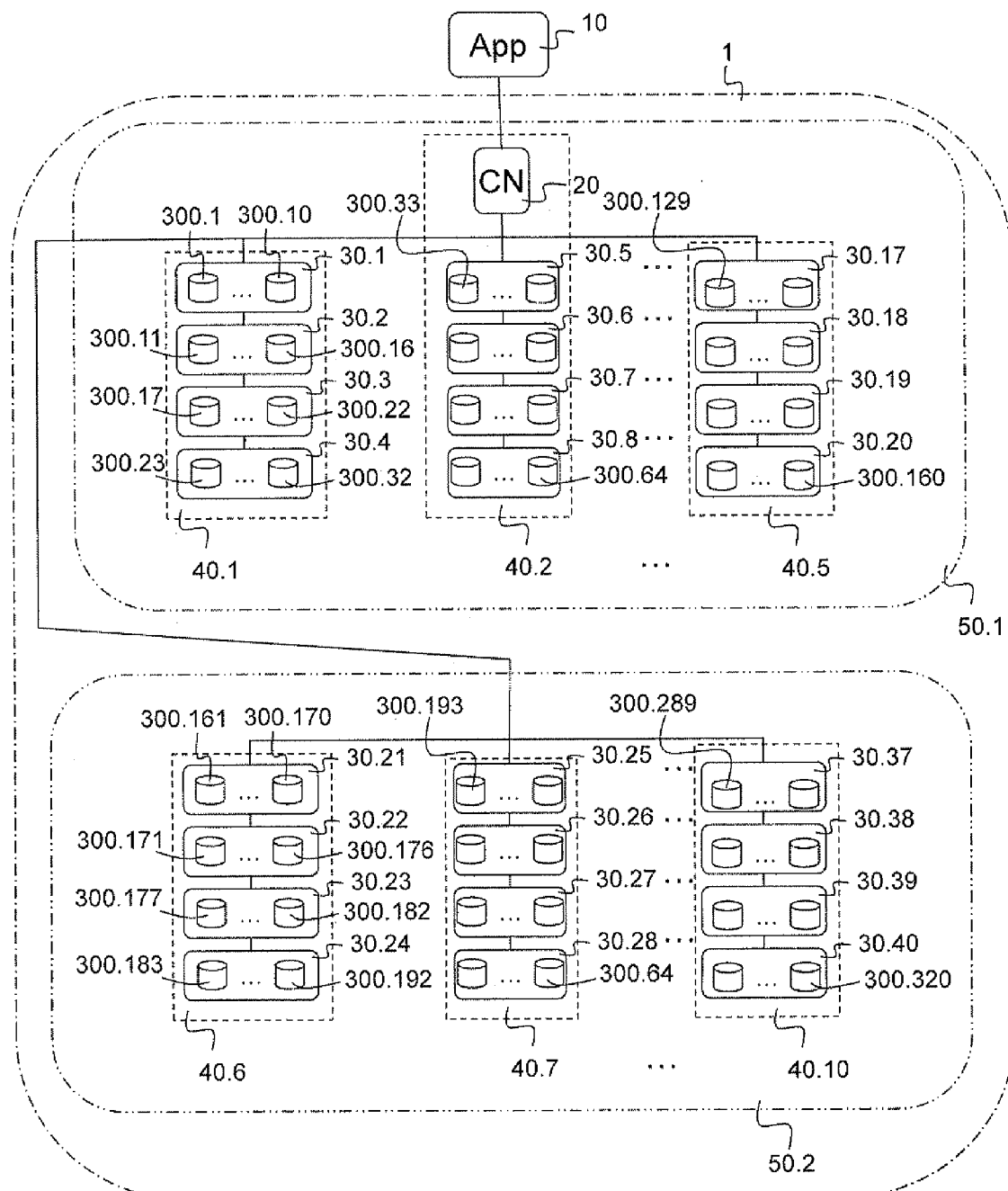
FIG. 7 shows an embodiment hierarchic distributed object storage system according to the invention.

As shown in the embodiment according to the invention in FIG. 7 the storage nodes 30 of the distributed object storage system as shown in FIG. 1 are arranged in a specific hierarchical configuration. The hierarchical configuration in this embodiment aligns with the physical allocation of the storage nodes 30. In this embodiment there are provided two distinct data centres 50.1 and 50.2 each housing five racks 40.1-40.5 and 40.6-40.10 respectively. As explained above these racks 40 each house a plurality of storage nodes 30, which comprise themselves a plurality of storage elements 300. In the embodiment of FIG. 7 in this way the distributed object storage system 1 comprises 320 storage elements 300.1-300.320. Some of the storage nodes 30 comprise ten storage elements 300, such as for example storage node 30.1 comprising storage elements 300.1-300.10, or storage node 30.4 comprising storage elements 300.23-300.32. Other storage nodes comprise only six storage elements, such as for example storage node 30.2 comprising storage elements 300.11-300.16, or storage node 30.3 comprising storage elements 300.17-300.22. In this way there are arranged thirty two storage elements 300.1-300.32 across four storage nodes 30.1-30.4 in rack 40.1 of data centre 50.1. For the sake of simplicity the other four racks 40.2-40.5 of data centre 50.1 and the five racks 40.6-40.10 of data centre 50.2 have a similar configuration as their storage nodes 30 are concerned. Rack 40.2 additionally comprises a controller node 20 that is connected to all storage nodes 30 of the distributed object storage system 1 as explained above. Data centre 50.1 and data centre 50.2 could be arranged at distinct geographical locations. They could for example be located in different cities, different countries or different continents.

The desired reliability policy for redundancy and concurrent failure tolerance of storage elements 300 of the distributed object storage system 1 according to the invention can be supplemented with a spreading policy that comprises rules for selecting storage elements 300 in function of their respective hierarchical configuration, This means that in addition to the parameters x, f, k, n=k+f and r=k/n, which according to the embodiment of FIGS. 5 and 6 were x=800, f=6, k=10, n=k+f=16 and r=k/n=10/16, additional parameters are provided codifying further redundancy and failure tolerance on a higher hierarchical level than the storage elements 300. Such an additional parameter could be for example the number of concurrent failures of storage nodes 30 that the distributed object storage system 1 must be able to cope with, this parameter we will refer to as h1. Another parameter could be for example the number of concurrent failures of racks 40 that the distributed object storage system must be able to cope with, this parameter we will refer to as h2. According to an embodiment of the invention these additional parameters of the reliability policy that determine the supplemental spreading policy could for example be h1=2 and h2=1; which means that it is required for the distributed object storage system 1 to be able to cope with a concurrent failure of two storage nodes 30 and a failure of one entire rack 40.

If the spreading module 410 would apply the spreading policy as described above for the embodiment of FIG. 5, then all encoded sub blocks 600 of the data object 500 would have been stored on storage elements 300.1-300.16 which are arranged in storage nodes 30.1 and 30.2 of rack 40.1, this would not fulfill the requirements of the supplemental spreading policy mentioned above, because when for example storage nodes 30.1 and 30.2 would concurrently fail, or when the entire rack 40.1 would become unavailable, there would not be enough sub blocks 600 retrievable in order to allow for decoding the stored data object 500 during a subsequent retrieval operation.

Figure 8:
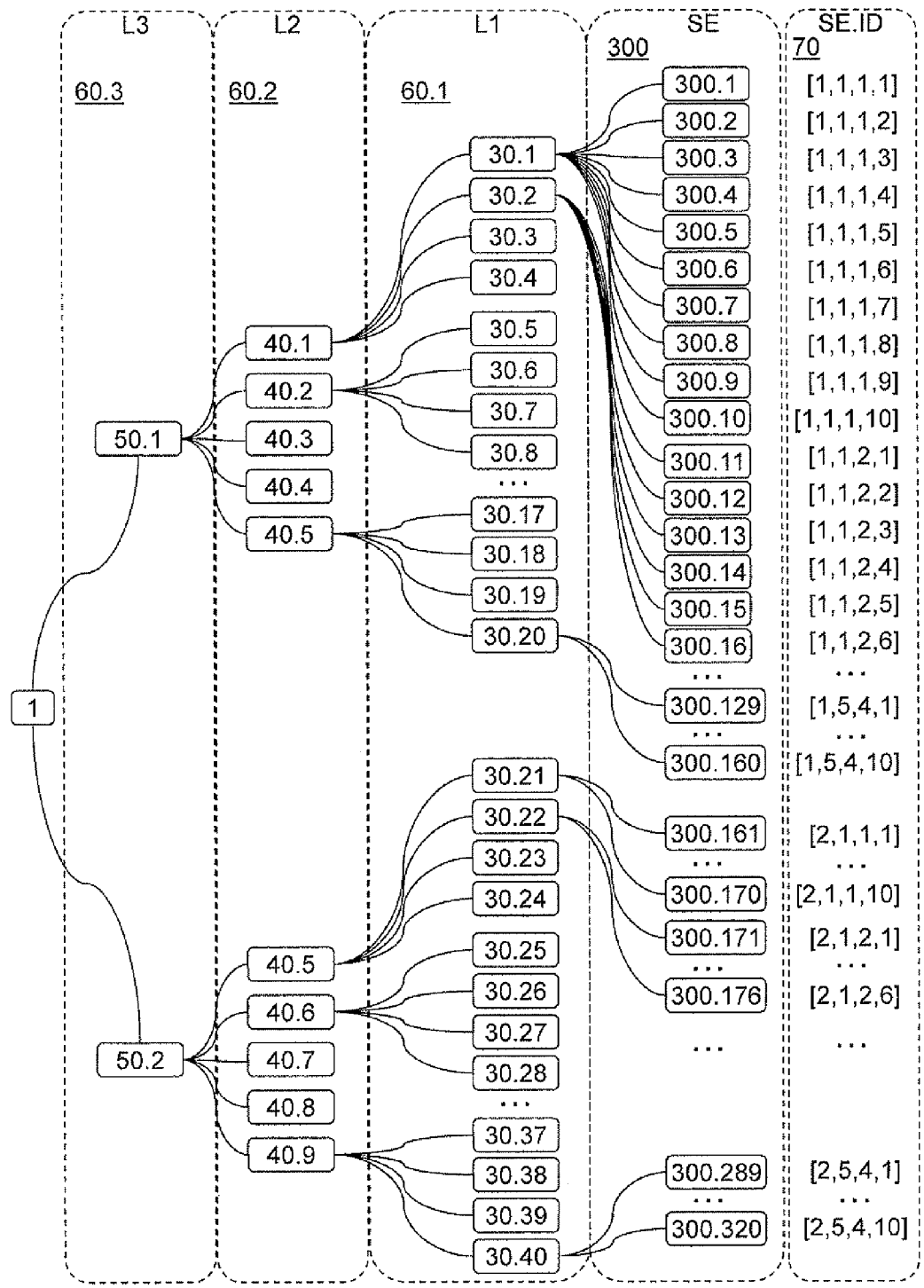
FIG. 8 schematically illustrates the different levels of the hierarchic tree structure provided by the hierarchic distributed object storage system according to FIG. 7.

Therefor the spreading module 410 of the distributed object storage system 1 according to the invention must take into account the parameters of the supplemental spreading policy for selecting suitable storage elements 300 for spreading the sub blocks 600 of a data object 500 during a storage operation. In order to accomplish this the spreading module 410 must be able to identify the respective hierarchical configuration of the storage elements 300 of the distributed object storage system 1. FIG. 8 shows a schematic representation of the hierarchical configuration of the embodiment of the distributed object storage system 1 shown in FIG. 7. As shown in FIG. 8 the different levels of the hierarchical configuration of the storage elements 300 of the distributed object storage system 1 form a tree structure. At the first level of the hierarchy 60.1, the storage elements 300 are grouped according to their respective storage nodes 30. At the second level of the hierarchy 60.2 these storage nodes 30 are once again grouped according to their respective racks 40. At the third level 60.3 of the hierarchy these racks 40 are grouped according to their corresponding data centres 50.

Each of the storage elements 300 comprises a corresponding unique storage element identifier 70. As can be seen in FIG. 8 the unique storage element identifier 70 of storage element 300.1 is [1,1,1,1], that of storage element 300.2 is [1,1,1,2], that of storage element 300.12 is [1,1,2,2], that of storage element 300.289 is [2,5,4,1], etc. It is clear that in this embodiment the unique storage element identifier 70 comprises several identifiers that identify the corresponding hierarchical configuration of each specific storage element 300. As represented in FIG. 8 and in more detail in FIG. 9, the unique storage element identifier 70 comprises an array of four numerals. The left most or first numeral in the array provides a third hierarchy level identifier 70.3, the second numeral provides a second hierarchy level identifier 70.2, the third numeral provides a first hierarchy level identifier 70.1 and the fourth and right most numeral provides an additional identifier such that the storage element identifier 70 as a whole for each of the storage elements 300 is unique. In this embodiment this means that each storage element identifier 70 has a unique sequence of these four numerals.

Figure 9:
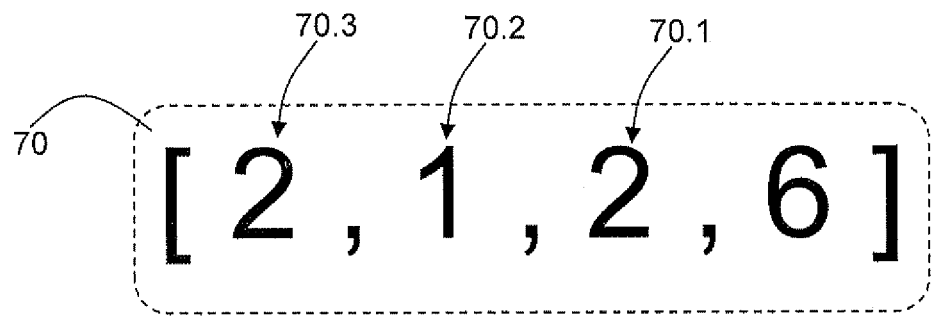
FIGS. 9-11 schematically illustrates alternative embodiments of the unique storage element identifier.

It is clear that, according to the embodiment of the distributed object storage system 1 as shown in FIGS. 7, 8 and 9, that the first hierarchy level identifier 70.1 provides an identifier for the storage node 30 comprising the specific storage element 300 that is identified by this unique storage element identifier 70. For example it is clear from the above explanation that storage element 300.176 identified by the unique storage element identifier [2,1,2,6] as shown in FIG. 9 and that this storage element identifier immediately also identifies its specific position in the hierarchical configuration. The right most numeral "2" shows that this storage element 300.176 is located in the second data centre 50.2 of the distributed object storage system, the second number "1" identifies the first group of storage nodes arranged in rack 40.5, the third numeral "2" identifies the fourth storage node 30.20 of this group of storage nodes 30 and the last numeral identifies the tenth storage element 300.176 of this storage node 30.20.

It is also clear that instead of the sequence of integers used in the embodiment of FIG. 8 alternative selections of numerals or other suitable identifiers such as suitable identifiers that can be coded into a binary form, such as alphanumerical characters, hexadecimal numbers, binary codes, . . . .

Figure 10:
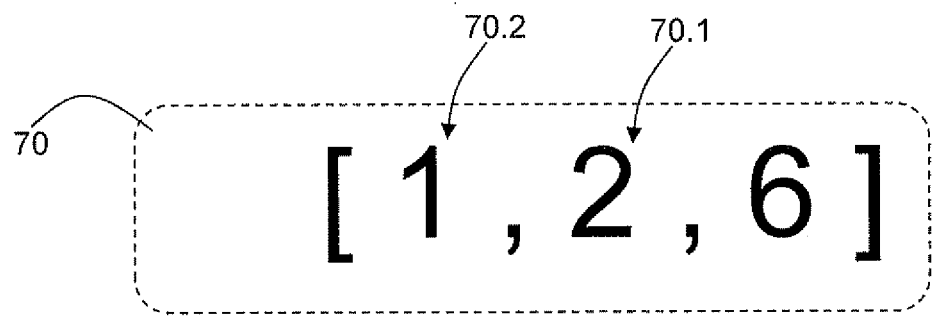

According to a further alternative embodiment the hierarchical part of the unique storage element identifier 70 according to the invention could be limited to a first level hierarchical identifier 70.1 identifying the storage element 30 and a second level hierarchical identifier which identifies a group of storage elements 30, for example a group storage elements 30 arranged in the same data centre 50. According to this embodiment whether the storage elements are for example grouped in a same rack is not taken into account in the hierarchical configuration. Such an embodiment in which the hierarchical part of the unique storage element identifier 70 is limited to the first and second level hierarchical identifiers, is for example shown in FIG. 10. It is further not required for the hierarchic configuration to have a link to physical structure such as a rack 40 or a data centre 50, it could also be determined on the basis of a specific grouping of storage elements 300 based on for example an arbitrary selection of storage nodes 30.

Figure 11:
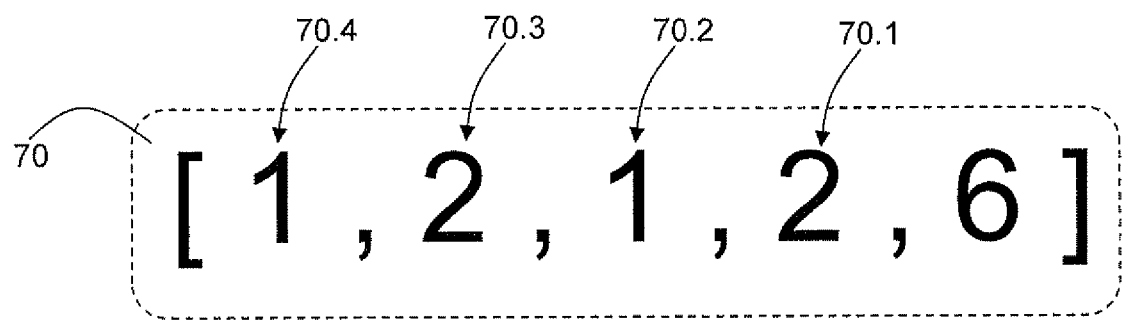

According to still a further alternative embodiment the hierarchical part of the unique storage element identifier according to the invention could be the hierarchical part of the unique storage element identifier 70 could comprise still a fourth level hierarchical identifier 70.4, as for example shown in FIG. 11, that for example identifies a group of data centres 50 that are located in the same country or on the same continent. It is clear that still further levels of hierarchical identifiers could be comprised in the unique storage element identifier.

The distributed object storage system 1 according to the invention is configured to take into account the hierarchical configuration when the spreading module 410 is making a selection of storage elements 300. As explained above the spreading module will during a storage operation select a number of storage elements 300 being equal to said desired spreading width n=16 by means of a reliability policy supplemented by a spreading policy that comprises rules for selecting storage elements 300 in function of their hierarchical configuration as identified by their storage element identifier 70. Therefor in the example described above in which the parameter for concurrent failures of storage nodes 30 was h1=2 and the parameter for concurrent failures of racks 30 was h2=1, the spreading module 410 will take into account this supplemental spreading policy so that the sub blocks 600 to be stored will be suitably spread. In the context of the example described above with a reliability policy where n=16 and f=6 this means that the spreading module will select 16 storage elements of which only a maximum of f/h2=6/1=6 storage elements 300 are arranged in the same rack 40 and that only f/h1=6/2=3 storage elements are arranged in the same storage node 30. The spreading module 410 accomplishes this by determining during the selection of suitable storage elements 300 to which storage node 30 and rack 40 they belong by analysing respectively the first hierarchy level identifier 70.1 and the second hierarchy level identifier 70.2 of their unique storage element identifier 70. As soon as the spreading module 410 has for example selected 3 storage elements 300 of which it has detected that they belong to the same storage node by analysing their hierarchical configuration, it will no longer add candidate storage elements 300 that belong to that specific storage node 30, but will continue selecting other storage elements 300 that belong to another storage node while continuously checking that not more than 3 storage elements 300 of the same storage node 30 are selected. This means that, in the embodiment according to FIG. 8, when comparing the storage elements identifiers 70 of the candidate storage elements 300 for selection by the spreading module only a maximum of 3 of these candidate storage elements will be selected that have the same combination of hierarchical identifiers of the first level 70.1, second level 70.2 and third level 70.3. During this selection activity of suitable storage elements 300 the spreading module will concurrently monitor the fact that only a maximum of 6 of these storage elements 300 are arranged in the same rack 40. This means that, in the embodiment according to FIG. 8, when comparing the storage elements identifiers 70 of the candidate storage elements 300 for selection by the spreading module only a maximum of 6 of these candidate storage elements will be selected that have the same combination of hierarchical identifiers of the second level 70.2 and third level 70.3. It is clear that if a different scheme for providing hierarchical identifiers was used, for example a scheme in which the hierarchical identifiers are identified by a continuous series of unique numerals, instead of restarting the numbering at 1 every time a new higher hierarchical grouping is started, the analysis could be accomplished by only analysing the first hierarchy level identifier 70.1 or the second hierarchy level identifier 702 respectively.

According to a further embodiment in the case that the storage element identifier 70 further comprises a third level identifier 70.3 and/or further level identifiers, the spreading policy will further comprise rules for selecting storage elements 300 in function of this third hierarchy level identifier 70.3 and/or this further hierarchy level identifiers. This could for example be implemented by using a spreading policy that takes into account additional parameters for determining the selection of suitable storage elements 300 for storing sub blocks 600 during a storage operation. Such additional parameters could for example codify rules such as the distributed object storage system 1 must be able to survive loss or unavailability of one data centre, the distributed object storage system must be able to survive loss of 25% of the data centres on each continent, etc. It is also possible to make any suitable combination of rules that involve multiple levels of the hierarchical configuration of the distributed object storage system according to the invention, such as for example, the distributed object storage system must be able to survive the loss of an entire rack and one additional node.

It is further clear that the spreading policy could be based on any suitable combination of hierarchy level identifiers and does not require usage of all available hierarchy level identifiers available in the storage element identifier 70. This means that for example the spreading policy could take into account the second hierarchy level identifier 70.2 and the fourth hierarchy level identifier 70.4, while disregarding the first hierarchy level identifier 70.1 and the third hierarchy level identifier 70.3.

The distributed object storage system 1 in this way allows for a dynamic setup of the system, this means that storage elements 300, storage nodes 30 or even complete racks 40 or data centres 50 can be added, removed or reconfigured in the distributed object storage system 1 without the need for extensive manual configuration of the system. In a system with a static configuration of which from most of the storage elements 300 already a considerable amount of the storage capacity is being used, when a new storage node 30 comprising a plurality of storage elements 300 is added to this distributed object storage system, then a spreading policy that only takes into account available storage capacity on the storage nodes 30 will normally store most of the sub blocks 600 on the new storage elements 300 of the new storage node 30, which presents an increased risk in the scenario where this new storage node 30 would break down. The distributed object storage system 1 according to the invention 1 mitigates this risk by means of the use of the unique storage elements identifiers 70 comprising the hierarchy level identifiers as discussed above for a supplemental spreading policy and does this in a way that only requires minimal configuration as the only configuration activity that needs to be performed is assigning a new storage node 30 the correct hierarch level identifiers, the storage node 30 can then preferably automatically generate a unique storage element identifier 70 for all the storage elements 300 it contains. For example when adding storage node 30.1 upon assigning it these hierarchy level identifiers [1,1,1, . . . ] it can generate the unique storage element identifiers for the storage elements 300.1-300.16 it comprises as [1,1,1,1]-[1,1,1,16] as shown in the embodiment according to FIG. 8.

According to an alternative embodiment of the distributed object storage system 1 the spreading module 410 is operable to differentiate the selection of the number of storage elements 300. This means that in function of the spreading policy, the spreading module 410 will determine for one or more of the respective levels of the hierarchy on how many storage elements 300 the sub blocks need to be stored in order to fulfill both the reliability policy as well as the supplemental spreading policy. This can be implemented in a simple manner by determining the number of storage elements 300 to be selected by the spreading module according to one or more of their respective hierarchy level identifiers (70.1, 70.2, 70.3, 70.4) in function of the spreading policy. For example in an alternative embodiment similar to that of FIG. 8 in which a first rack 40 comprises 4 storage nodes 30, and a second rack 40 comprises 20 storage nodes 30, each of these storage nodes 30 comprising 10 storage elements 300. During a storage operation with a reliability policy where n=16 and f=6, the spreading module will need to spread the sub blocks across at least 16 storage elements 16. If there is a supplemental spreading policy that requires the system to be able to survive the failure of one storage node 30 for each rack 40. Then the sub blocks 600 must be spread by the spreading module amongst storage elements 300 from at least the four storage nodes 30 of the first rack 40 and at least 12 of the storage nodes 30 of the second rack 40. When one storage node 30 of each rack 40 fails, then 3 storage nodes 30 from the first rack 40 and at least 11 storage nodes 30 from the second rack 40 will still be available and the amount of sub blocks 600 on their storage elements 300 will allow for successful retrieval of the stored data object 500 as explained above. It is clear that the predetermined number of sub blocks 600 could be spread in equal amounts across all the selected storage elements, but alternatively the sub blocks 600 could also be spread in an unbalanced manner across the selected storage elements 300. This means that the $4/16^{th}$ of the predetermined number of sub blocks 600 are stored on the storage elements 300 each of the 4 storage nodes 30 of the first rack 40 and $12/16^{th}$ of the predetermined number of sub blocks 600 are spread amongst the storage elements 300 of 12 or more, for example 16 of the storage nodes 30 of the second rack 40, which means that the storage elements 300 of the second rack 40 would only need to store ¾ of the amount of sub blocks 600 per storage node 30 when compared to the amount of sub blocks 600 stored 600 per storage node 30 of the first rack 40. This thus allows to store less data per storage element 300 if more storage elements 300 are available in a specific part of the hierarchical configuration, while still fulfilling the requirements of the reliability policy and the supplemental spreading policy.

The distributed object storage system 1 according to the invention is able to reduce the impact of storage elements 300 that are unresponsive during a storage operation, this means that the storage element 300 responds slow when compared to for example the average responsiveness of the storage elements 300 or a predetermined expected level of responsiveness or does not respond at all, by means of an advantageous implementation of the spreading module 410 as described below. In prior art systems a storage operation is only marked complete when all of the encoded sub blocks 600 are successfully stored on the storage elements 300. As such, one unresponsive storage element 300 could present the risk of seriously degrading the performance of the storage operation and thus the distributed object storage system as a whole. Therefor the spreading module 410 according to this advantageous embodiment of the invention is operable to store the predetermined number of the redundant sub blocks 600 on a number of said storage elements 30 being larger or equal to said desired spreading width in two distinct phases. In the first phase the required share of sub blocks 600) is stored on a number of said storage elements 300 which corresponds to a safety threshold. This safety threshold should be larger than or equal to said minimal spreading requirement. In the example described above with n=16, f=6 and thus k=10, this that the required amount of sub blocks 600 must be stored on at least k=10 storage elements 300 before this safety threshold is reached. In this way the sub blocks 600 will be stored first on the fastest storage elements 300 and this safety threshold will be reached much faster than the completion of the overall storage operation. In a subsequent second phase the remaining sub blocks 600 are then stored on the remaining unresponsive storage elements 300. This means that the required share of sub blocks 600 is stored on the number of remaining storage elements 300 so that the total number of storage elements 30 reaches said number being larger or equal to said desired spreading width. In the example described above with n=16; f=6 and k=10 this means then that the total number of storage elements 300 must be completed to n=16 after the first phase and thus still at least 6 of the storage nodes 300 of the distributed object storage system 1 need to be provided with the required sub blocks 600 in order to fulfill the requirements of the reliability policy. It is clear that the safety threshold can be any number as long as it is larger than the minimal spreading requirement and smaller than the total number of storage elements 600 selected by the spreading module 410 for storing all sub blocks 600 during a storage operation. A spreading module 410 configured in this way enables to distributed object storage system 1 to handle the critical part of the storage operation in a first time period which will be considerable shorter than the time period necessary for the overall completion of the storage operation. The requirements for performing the remaining part of the overall storage operation can as such be more relaxed and can be performed in for example a configurable predetermined time period after initiation of the storage operation, for example 1 or 2 days, as in the meantime, although the data object 500 is still not stored according to the required reliability policy it will be retrievable if the chances of the distributed object system 1 suffers such concurrent failures of storage elements 300 in this predetermined time period are sufficiently low. In this way the storage operation can be significantly sped up as the critical part of the storage operation is performed first, making available resources for other storage operations much faster and subsequently the less critical part of the storage operation is performed afterwards, preferably when the resources of the distributed object storage system 1 are less loaded, with only a minimal impact on the reliability of the system. It is clear that it is not required to determine before the initiation of the storage operation which of the storage elements 300 are unresponsive. The spreading module 410 can simply initiate storage of the sub blocks on the required storage elements 300 and abort this operation for the unresponsive storage elements 300 as soon as the safety threshold is reached.

According to a preferred embodiment of the invention the spreading module 410 keeps track of the storage elements 300 that are unresponsive during a storage operation. If such storage elements 300 repeatedly show unresponsive behaviour they can be ignored for a predetermined time period. Optionally this time period can be adapted incrementally, for example using an exponential back off scheme, if these storage elements 300 show unresponsive behaviour. By keeping track of the unresponsive storage elements 300, all applications 10 making use of the distributed object storage system 1 will benefit from the reduced impact on the storage operation response times.

According to still a further embodiment the spreading module 410 will temporarily store the predetermined amount of sub blocks 600 on the fastest storage elements 300 and move them to the unresponsive storage elements 300 later. In this way, by temporarily adding additional data to the data already stored in the first phase as described above, this provides the storage operation with additional reliability until the unresponsive storage nodes are reached with a minimal impact on the performance of the storage operation. This means that in the first phase to store the predetermined number of redundant sub blocks 600, all sub blocks are stored entirely on the first number of storage elements 300 and then in the subsequent second phase the required share of said sub blocks 600 are moved to the second number of remaining storage elements 300. As such after completion of the first phase of the storage operation all required sub blocks 600 are already stored on storage elements 300 of the distributed object storage system 1 and only the spreading needs to be adapted in order to fully comply with the reliability policy during the second phase.

Although unresponsive behaviour of storage elements 300 in the above described embodiments has always been determined on the level of a single storage element 300, it is clear that overall performance of a group of storage elements 300 as identified by their respective hierarchy level identifiers can be determined and subsequently be used by the spreading module 410 according to the invention in order to determine the performance of storage elements based on their unique storage element identifier and their corresponding position in the hierarchical configuration of the distributed object storage system 1.

According to still a further embodiment of the distributed object storage system 1 the effect of unresponsive storage elements 300 during a retrieval operation is mitigated in a simple and effective way. Instead of retrieving sub blocks 600 from all relevant storage elements 300 in sequential order, or in parallel in an equal amount. The clustering module 420 according to this embodiment of the invention will retrieve at least said predetermined multiple of said minimal spreading requirement of said redundant sub blocks 600 with a preference for the most responsive storage elements 300. In this way the retrieval operation will not be slowed down by the performance of the most unresponsive storage element 300.

Figure 12:
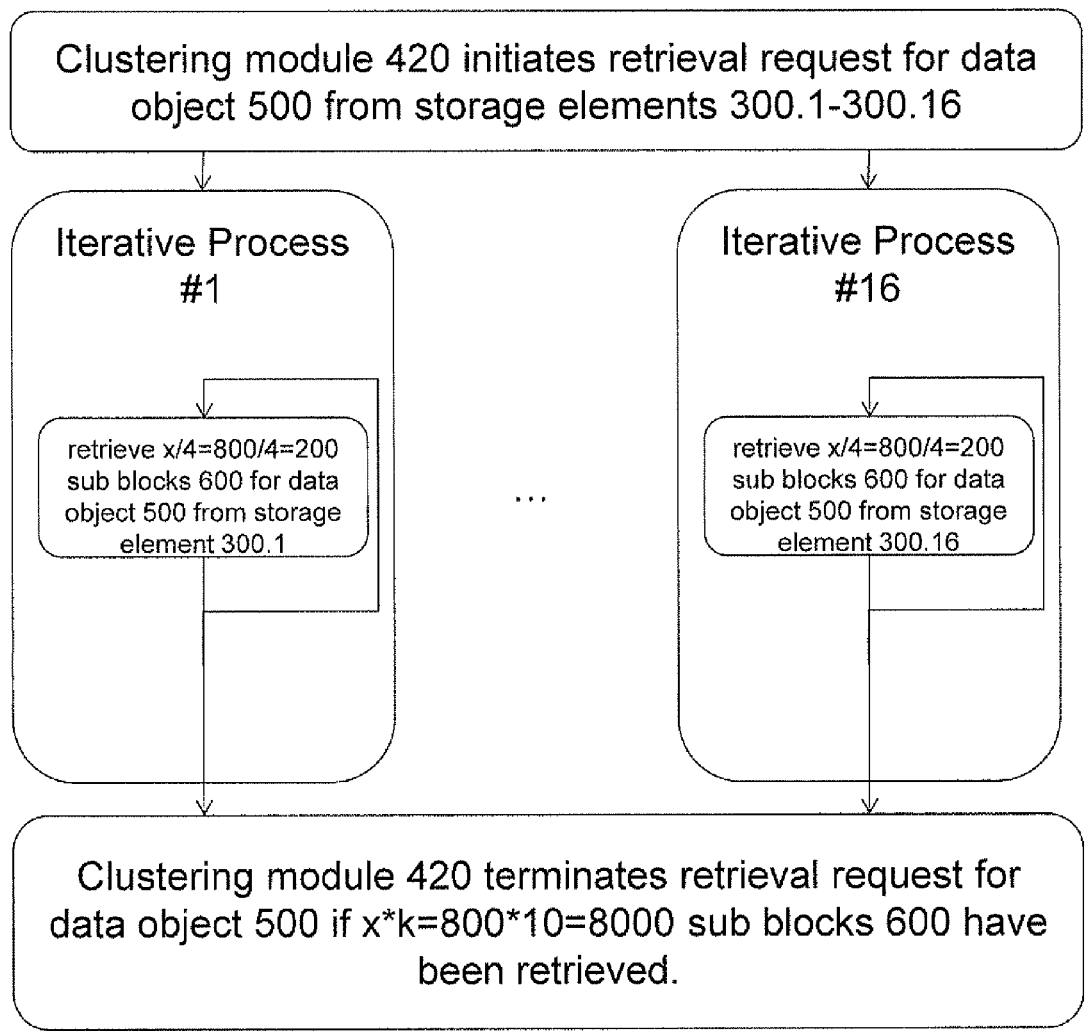
FIG. 12 schematically shows an embodiment of a retrieval operation.

According to a beneficial implementation of the clustering module 420 this can even be done in an iterative way without requiring the performance of the storage elements 300 to be assessed beforehand. The method used by the clustering module 420 during such a retrieval operation is shown in FIG. 12. This illustrates the method applied to the read request of the example discussed with regard to the retrieval operation as shown in FIG. 6. When executing the retrieval operation the clustering module 420 will issue a read request for the $x*n=16*800=12800$ sub blocks 600.1-600.12800 of the data object 500 stored on the storage elements 300.1-300.16. This read request will be transformed into a parallel process, one for each of the storage elements 300.1-300.16, for retrieving iteratively a predetermined share of the sub blocks 600 stored on them. In this example there are stored 800 sub blocks on each of the storage elements 300.1-300.16 and the predetermined share that is retrieved during the iterative process is for example ¼ of the stored sub blocks 600, which means in this example 200 sub blocks. These parallel processes will as such iteratively retrieve sub blocks 600 from the storage elements 300 until the predetermined multiple of said minimal spreading requirement $x*k=800*10=8000$ of these sub blocks 600 is reached, such that the decoding module 430 can subsequently successfully assemble the data object 500 as explained above. It is clear that the iterations for the most responsive storage elements 300 will complete faster than those for the unresponsive storage elements 300. As such while executing the retrieval operation, more iterations will be performed on the most responsive storage elements then on the unresponsive storage elements and as such when the requirement of the predetermined multiple of said minimal spreading requirement $x*k=800*10=8000$ is met more sub blocks will have been retrieved from the most responsive storage elements 300, while still allowing for a contribution of the unresponsive storage elements 300 to the performance of the overall retrieval operation.

According to still a further alternative embodiment so that the clustering module 420 can prioritize the iterative processes on the storage elements 300 that have the highest performance. This can be done by analysing the performance of their respective iterative operations, but alternatively storage elements that have similarities in their hierarchical configuration that resemble those of fast storage elements 300 could for example be prioritized with regard to the execution of their corresponding iterative operations. This does not only provides a simple and fast retrieval operation, but in many cases storage elements 300 that are in close in their hierarchical configuration, for example, in the same storage node 30, in the same rack 40, in the same data centre 50, provide also for the cheapest solution bandwidth-wise.

According to still a further alternative embodiment, the effect of an unresponsive storage element 300 can be mitigated by applying the same principles as explained above during a storage operation. In that case instead of storing sub blocks 600 for all relevant storage elements 300 in sequential order, or in parallel in an equal amount. The spreading module 410 according to this embodiment of the invention will retrieve at least said predetermined multiple of said minimal spreading requirement of said redundant sub blocks 600 with a preference for the most responsive storage elements 300. In this way the storage operation will not be slowed down by the performance of the most unresponsive storage element 300.

Figure 13:
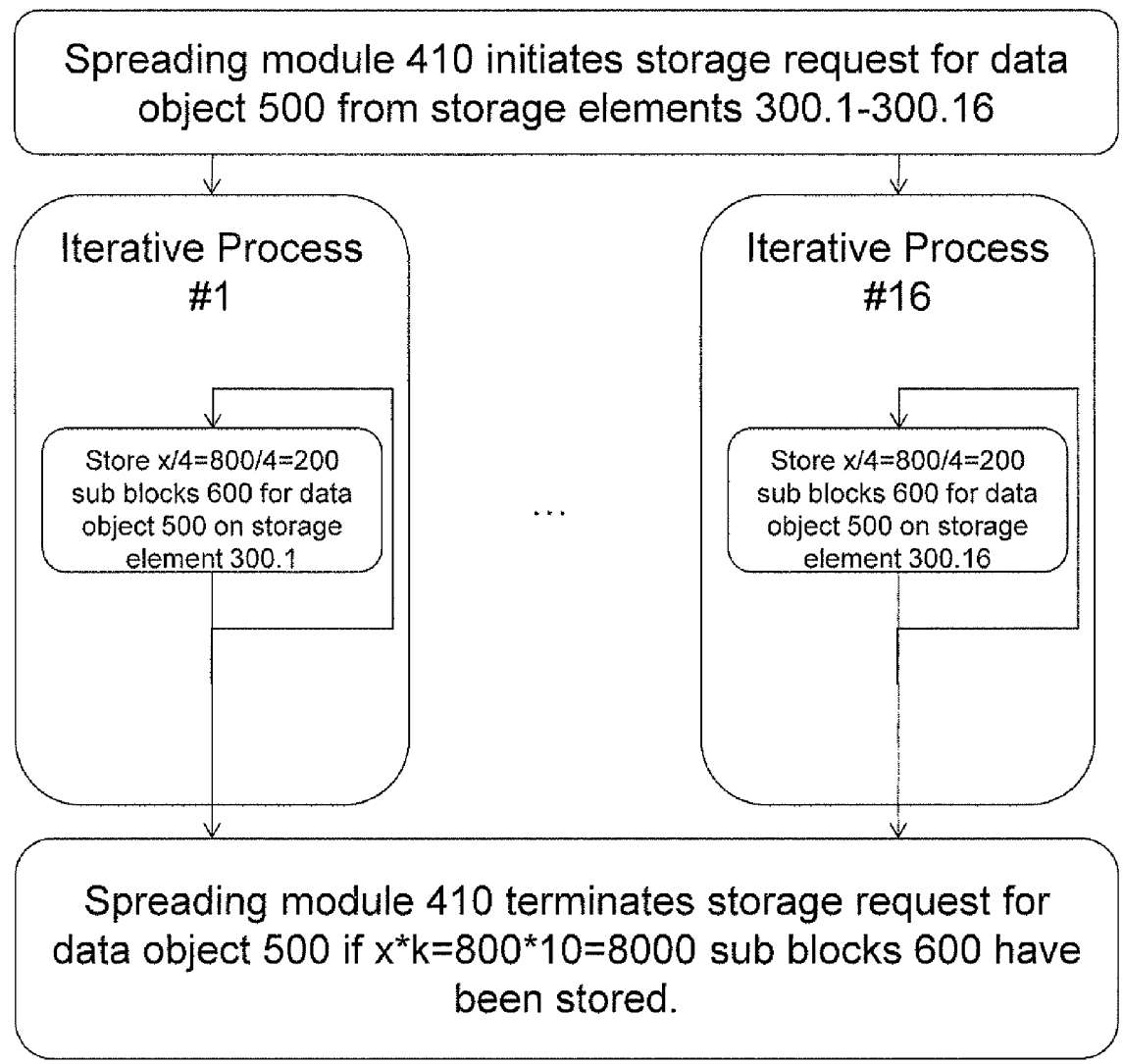
FIG. 13 schematically shows an embodiment of a storage operation.

According to a beneficial implementation of the spreading module 410 this can even be done in an iterative way without requiring the performance of the storage elements 300 to be assessed beforehand. The method used by the spreading module 410 during such a storage operation is shown in FIG. 13. This illustrates the method applied to the storage request of the example discussed with regard to the storage operation as shown in FIG. 5. When executing the storage operation the spreading module 410 will issue a storage request for the $x*n=16*800=12800$ sub blocks 600.1-600.12800 of the data object 500 to be stored on the storage elements 300.1-300.16. This storage request will be transformed into a parallel process, one for each of the storage elements 300.1-300.16, for storing iteratively a predetermined share of the sub blocks 600 to be stored on them. In this example there need to be stored 800 sub blocks on each of the storage elements 300.1-300.16 and the predetermined share that is to be stored during the iterative process is for example ¼ of the sub blocks 600 to be stored, which means in this example 200 sub blocks. These parallel processes will as such iteratively store sub blocks 600 on the storage elements 300 until the predetermined multiple of said minimal spreading requirement $x*k=800*10=8000$ of these sub blocks 600 is reached, such that the decoding module 430 during a subsequent retrieval operation can successfully assemble the data object 500 as explained above. It is clear that the iterations for the most responsive storage elements 300 will complete faster than those for the unresponsive storage elements 300. As such while executing the storage operation, more iterations will be performed on the most responsive storage elements then on the unresponsive storage elements and as such when the requirement of the predetermined multiple of said minimal spreading requirement $x*k=800*10=8000$ is met more sub blocks will have been stored on the most responsive storage elements 300, while still allowing for a contribution of the unresponsive storage elements 300 to the performance of the overall storage operation.

According to a preferred embodiment of the distributed object storage system 1 unresponsive storage elements 300 that remain unresponsive for a time period that exceeds a predetermined sleep time period threshold, for example longer than one or two days or storage elements 300 that store data objects 500 with a frequency of retrieval below a predetermined sleep frequency threshold, for example less retrieval than once per month, are powered down. In this way the distributed object storage system 1 can provide large power savings while still providing the same reliability threshold. Specific branches of the hierarchical configuration of the distributed object storage system 1 can be marked to contain unresponsive or low access storage elements 300 so that during a storage operation low access data objects 500, such as for example backup data or redundant data, can preferably be stored on these storage elements 300.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

We claim:

1. A distributed object storage system comprising:
    a plurality of redundant storage elements, operable to store and retrieve a data object comprising a data object identifier in the form of a predetermined number of redundant sub blocks comprising said data object identifier, said predetermined number corresponding to a predetermined multiple of a desired spreading width, which is the sum of:
        a minimal spreading requirement, corresponding to the minimal number of storage elements that must store sub blocks of said data object and are not allowed to fail; supplemented with
        a maximal concurrent failures tolerance, corresponding to the number of storage elements that must store sub blocks of said data object and are allowed to fail concurrently;
    each one of said redundant sub blocks comprising:
        encoded data of equal size of the data object divided by a factor equal to said predetermined multiple of said minimal spreading requirement; and
        decoding data, enabling said data object to be decoded from any combination of said redundant sub blocks of which the number corresponds to predetermined multiple of said minimal spreading requirement;
    a plurality of storage nodes each comprising a share of said plurality of redundant storage elements; and
    at least one controller node, operably connected to or comprised within said storage nodes when storing or retrieving said data object, and comprising:

an encoding module operable to disassemble said data object into said predetermined number of redundant sub blocks;

a spreading module operable to store said predetermined number of said redundant sub blocks on a number of said storage elements that is larger or equal to said desired spreading width;

a clustering module operable to retrieve at least said predetermined multiple of said minimal spreading requirement of said redundant sub blocks from a plurality of said storage elements; and a decoding module operable to assemble said data object from any combination of said redundant sub blocks of which the number corresponds to said predetermined multiple of said minimal spreading requirement;

each of said plurality of redundant storage elements comprising a unique storage element identifier, said storage element identifier comprising:

a first hierarchy level identifier, which provides an identifier for the storage node comprising said storage element identified by said storage element identifier; and a second hierarchy level identifier, which provides an identifier for a predetermined selection of a plurality of storage nodes comprising said storage element identified by said storage element identifier; and said spreading module causing a selection of said number of said storage elements to be larger or equal to said desired spreading width by a spreading policy that comprises rules for selecting storage elements as a function of at least one of said first hierarchy level identifier and said second hierarchy level identifier.

2. The distributed object storage system according to claim 1, wherein said storage element identifier further comprises at least one of a third level hierarchy identifier and further level hierarchy identifiers, which provide an identifier for a predetermined selection of a plurality of said second hierarchy level identifiers or further previous hierarchy level identifiers respectively, and said spreading policy further comprising rules for selecting said storage elements as a function of at least one of said third hierarchy level identifier and said further hierarchy level identifiers.

3. The distributed object storage system according to claim 1, said spreading policy further comprising rules for whitelisting or blacklisting a plurality of storage elements as a function of one or more of said hierarchy level identifiers included in their corresponding storage element identifier.

4. The distributed object storage system according to claim 1, wherein said spreading module is operable to differentiate the selection of said number of storage elements according to one or more of their respective hierarchy level identifiers as a function of said spreading policy.

5. The distributed object storage system according to claim 1, said spreading module being operable to store said predetermined number of said redundant sub blocks on a number of said storage elements that is larger or equal to said desired spreading width in two distinct phases:

in a first phase the required share of sub blocks is stored on a first number of fast storage elements which corresponds to a safety threshold, said safety threshold being larger than or equal to said minimal spreading requirement; and in a subsequent second phase the required share of said sub blocks is stored on a second number of remaining unresponsive storage elements so that the total number of storage elements reaches said number being larger or equal to said desired spreading width.

6. The distributed object storage system according to claim 5, wherein said spreading module is operable to perform said subsequent second phase of said storage operation during a configurable, predetermined time period.

7. The distributed object storage system according to claim 5 wherein said spreading module is operable:

in said first phase to store said predetermined number of said redundant sub blocks entirely on said first number of said storage elements; and in said second phase to move said required share of said sub blocks to said second number of remaining storage elements.

8. The distributed object storage system according to claim 5, wherein said spreading module is operable to temporarily ignore unresponsive storage elements.

9. The distributed object storage system according to claim 8, wherein said spreading module is operable to gradually increase a period of ignorance for said storage elements that remain unresponsive repeatedly.

10. The distributed object storage system according to claim 1, wherein said clustering module is operable to retrieve more sub blocks from the most responsive storage elements.

11. The distributed object storage system according to claim 10, wherein said clustering module is operable to transform a retrieval request for said data object, into a plurality of parallel iterative processes, one for each of said storage element storing sub blocks of said data object, said iterative process retrieving iteratively a predetermined share of said sub blocks stored on said respective storage element until the amount of sub blocks jointly retrieved by said parallel iterative processes is larger than or equal to said predetermined multiple of said minimal spreading requirement.

12. The distributed object storage system according to claim 1, wherein said spreading module is operable to retrieve more sub blocks from the most responsive storage elements.

13. The distributed object storage system according to claim 12, wherein said spreading module is operable to transform a storage request for said data object, into a plurality of parallel iterative processes, one for each of said storage element where sub blocks of said data object need to be stored, said iterative process storing iteratively a predetermined share of said sub blocks to be stored on said respective storage element until the amount of sub blocks jointly stored by said parallel iterative processes is larger than or equal to said predetermined multiple of said minimal spreading requirement.

14. The distributed object storage system according to claim 5, wherein unresponsive storage elements that remain unresponsive for a time period that exceeds a predetermined sleep time period threshold or storage elements that store data objects with a frequency of retrieval below a predetermined sleep frequency threshold are powered down.

\* \* \* \* \*